United States Patent Office

3,459,658
Patented Aug. 5, 1969

3,459,658
REMOVAL OF IRON CONTAMINANTS FROM HYDROCARBON OILS
Gordon E. Langlois, El Cerrito, and Lloyd J. Olson, Oakland, Calif., assignors to Chevron Research Company, San Francisco, Calif., a corporation of Delaware
No Drawing. Filed June 28, 1967, Ser. No. 649,450
Int. Cl. C10g 17/02
U.S. Cl. 208—252                7 Claims

ABSTRACT OF THE DISCLOSURE

A process for the removal of iron contaminants from hydrocarbon oils by contacting the oil at a temperature in the range of 100°–500° F. with at least one acid and at least one reducing agent in an aqueous medium. The reducing agent used must be capable of reducing iron from the ferric to the ferrous state. Organic acids and reducing agents are preferred.

BACKGROUND OF THE INVENTION

This invention relates to the removal of metallic contaminants from hydrocarbon oils and, in particular, to the removal of iron contaminants therefrom.

In catalytic cracking it has been known for some time that certain metals, particularly iron, nickel and vanadium, are very harmful to cracking catalysts. When deposited on cracking catalysts in concentrations of about 0.1 percent or less, such metals cause the production of excessive amounts of coke and gas at the expense of valuable gasoline and heating oil fractions. This leads to an overloading of the regeneration and gas handling equipment and reduces the allowable feed rate to the catalytic cracking units. Iron has been found to be a particularly detrimental contaminant, not only in catalytic cracking, but also in other catalytic processes such as hydrocracking.

This iron is brought into a cracking unit, along with the other unfilterable metallic impurities, such as nickel and vanadium, with the feedstock in the form of metallo-organic compounds. It is the removal of these iron contaminants with which the present invention is concerned.

SUMMARY

It has now been discovered that, if an iron contaminated hydrocarbon oil is contacted with at least one acid and at least one reducing agent in an aqueous medium, a substantial amount of the iron is removed.

Suitable acids are organic or mineral acids, and suitable reducing agents are inorganic or organic reducing agents. Mixtures of acids and/or reducing agents may be used; or materials, such as sulfur dioxide, which have both acidic and reducing properties in an aqueous medium, may be used.

DESCRIPTION OF THE PREFERRED EMBODIMENTS

In its broadest form, the process of this invention requires only that the iron-contaminated oil be contacted with an aqueous medium containing at least one acid and at least one reducing agent capable of reducing the iron from the ferric to the ferrous state.

In a preferred embodiment, acid of sufficient strength is used such that the pH of the aqueous acid solution is less than 3.0.

In another preferred embodiment, the temperature at which the contacting takes place is in the range of 100°–500° F.

In another preferred embodiment, an organic acid and organic reducing agent are used.

In another preferred embodiment, sulfur dioxide, which in an aqueous medium exhibits both acidic and reducing properties is used.

In general, the acid used may be any organic acid—such as acetic, formic, or oxalic acid—or any mineral acid—such as sulfuric, sulfurous, phosphoric, or hydrochloric acid—or any mixtures thereof. It is preferred, however, to use organic acids because of their greater ability to complex with the iron.

Any reducing agent capable of reducing iron from the ferric to the ferrous state may be used—for example, organic reducing agents, such as formaldehyde, acetone, hydrazine, or various other aldehydes or ketones, or inorganic reducing agents, such as stannous chloride, cuprous chloride, sulfur dioxide, or lithium aluminum hydride, or any mixtures thereof, may be used. Metal-containing reducing agents are less preferred, however; for, in many cases, they themselves form residues which may contribute to catalyst deactivation.

Table I illustrates the effectiveness of the process of this invention in removing iron from an iron-contaminated deasphalted oil. The oil, except where noted, initially contained 24 p.p.m. of iron, calculated as elemental iron. It will be noted that the presence of the reducing agent markedly increases the degree of demetalation over that obtainable with acid alone.

TABLE I

| | Run No. | | | | | | | | | |
|---|---|---|---|---|---|---|---|---|---|---|
| | 1 | 2 | 3 | 4 | 5 | 6 | 7 | 8 | 9 | 10 |
| | | | | | | Acid | | | | |
| | Acetic | Acetic | $H_2SO_3$ | $H_2SO_3$ | $H_2SO_4$ | $(NH_4)_2SO_3$ | $(NH_4)_2SO_4$ | Acetic | $H_2SO_4$ | Acetic |
| Concentration in aqueous medium, wt. percent | 5 | 5 | (1) | (2) | 5 | (3) | (4) | [5] 100 | 5 | 100 |
| Reducing agent | $CH_2O$ | $SO_2$ | $SO_2$ | $SO_2$ | $SO_2$ | $SO_2$ | $SO_2$ | $SnCl_2$ | None | None |
| Concentration in aqueous medium, wt. percent | 2.4 | (1) | (1) | (2) | (1) | (3) | (4) | 1.75 | | |
| Contacting temperature, °F | 197 | 189 | 187 | 185 | 210 | 197 | 197 | 212 | 196 | 212 |
| Length of contact, min | 15 | 15 | 15 | 15 | 25 | 15 | 5 | 10 | 15 | 10 |
| pH of aqueous phase | 2.5 | 1.0 | 1.6 | 3.0 | <1.0 | 5.0 | 3.1 | (5) | <1.0 | (5) |
| Iron content of treated product, p.p.m.[6] | 4.3 | 2.8 | 2.0 | 3.3 | 4.0 | 6.7 | 6.4 | [7] 0.8 | [7] 8 | [7] 6 |
| Percentage reduction of iron content | 82 | 88 | 92 | 86 | 83 | 72 | 73 | [7] 95 | [7] 55 | [7] 67 |

[1] Saturated aqueous $SO_2$ solution, 5.9 g. $SO_2$/1 $H_2O$.
[2] Aqueous $SO_2$ solution, 0.36 g. $SO_2$/1 $H_2O$.
[3] Aqueous $(NH_4)_2SO_3$ solution, 15.3 g. $SO_2$/1 $H_2O$.
[4] Aqueous $(NH_4)_2SO_3$ solution, 6.0 g. $SO_2$/1 $H_2O$.
[5] Glacial acetic acid.
[6] Calculated as elemental iron.
[7] Initial iron content, 18 p.p.m.

It will be noted from the data in Table I that iron removal is most effective when the aqueous treating phase is highly acidic. Consequently, it is preferred to maintain the pH of the phase below 3.

Suitable acid concentrations may range from 0.05–100 weight percent, with the range 0.1–5.0 weight percent being preferred. Reducing agent concentration may also be in the range of 0.05–5.0 weight percent, with the range of 0.1–5.0 weight percent being preferred. The aqueous medium contains both the acid and the reducing agent.

Contacting temperatures may be in the range of from about room temperature (about 70° F.) to about 600° F., with the range of 100°–250° F. preferred.

The above examples are given for illustrative purposes only. It is apparent that many widely different embodiments of this invention may be made without departing from the scope and spirit thereof and, therefore, it is not intended to be limited except as indicated in the appended claims.

We claim:
1. A process for removing iron from an iron-contaminated hydrocarbon oil which comprises contacting said oil with an aqueous medium containing at least one acid and at least one reducing agent capable of reducing iron from the ferric to the ferrous state.
2. The process of claim 1 wherein the pH of the aqueous solution is less than 3.
3. The process of claim 1 wherein the acid is an organic acid and the reducing agent is an organic reducing agent.
4. The process of claim 1 wherein the reducing agent is sulfur dioxide.
5. The process of claim 1 wherein the contacting temperature is in the range of from about 70° to about 600° F.
6. The process of claim 1 wherein the acid concentration and the reducing agent concentration are each individually within the range of 0.1–5.0 weight percent.
7. The process of claim 1 wherein the contacting temperature is in the range of from about 100° to about 250° F.

References Cited

UNITED STATES PATENTS 3,082,167   3/1963   Erdman _____ 208—252

FOREIGN PATENTS 1,185,324   1/1965   Germany.

DELBERT GANTZ, Primary Examiner

J. D. MEYERS, Assistant Examiner

U.S. Cl. X.R.

208—251